United States Patent
Chen et al.

(10) Patent No.: US 10,627,851 B2
(45) Date of Patent: Apr. 21, 2020

(54) REFERENCE CLOCK SIGNAL GENERATION METHOD, MEMORY STORAGE DEVICE AND CONNECTION INTERFACE UNIT

(71) Applicant: PHISON ELECTRONICS CORP., Miaoli (TW)

(72) Inventors: Chih-Ming Chen, Hsinchu County (TW); An-Chung Chen, Hsinchu County (TW); Kuen-Chih Lin, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 326 days.

(21) Appl. No.: 15/456,584

(22) Filed: Mar. 13, 2017

(65) Prior Publication Data
US 2018/0210652 A1   Jul. 26, 2018

(30) Foreign Application Priority Data

Jan. 20, 2017 (TW) .............................. 106102079 A

(51) Int. Cl.
| | |
|---|---|
| *G06F 1/04* | (2006.01) |
| *G06F 1/08* | (2006.01) |
| *G06F 13/16* | (2006.01) |
| *G06F 1/10* | (2006.01) |
| *G06F 1/14* | (2006.01) |

(52) U.S. Cl.
CPC .................. *G06F 1/08* (2013.01); *G06F 1/10* (2013.01); *G06F 1/14* (2013.01); *G06F 13/16* (2013.01)

(58) Field of Classification Search
CPC ...................................................... G06F 13/16
USPC ........................................................ 713/500
See application file for complete search history.

(56) References Cited

U.S. PATENT DOCUMENTS

| | | | | |
|---|---|---|---|---|
| 6,177,959 | B1* | 1/2001 | Bril | H03L 7/06 |
| | | | | 331/2 |
| 6,337,891 | B1* | 1/2002 | Kim | H03L 7/085 |
| | | | | 327/141 |
| 2003/0128786 | A1* | 7/2003 | Schmatz | H03K 5/1534 |
| | | | | 375/359 |

(Continued)

FOREIGN PATENT DOCUMENTS

| | | |
|---|---|---|
| CN | 1567119 | 1/2005 |
| CN | 1249552 C * | 4/2006 |
| TW | 201506580 | 2/2015 |

OTHER PUBLICATIONS

"Office Action of Taiwan Counterpart Application," dated May 8, 2017, p. 1-p. 10, in which the listed references were cited.

*Primary Examiner* — Volvick Derose
(74) *Attorney, Agent, or Firm* — JCIPRNET

(57) ABSTRACT

An exemplary embodiment of the present disclosure provides a reference clock signal generation method for a memory storage device. The method includes: receiving a first type signal from a host system; generating a first control parameter according to a frequency of the first type signal; receiving a second type signal from the host system after the first type signal is received; generating a second control parameter according to a frequency of the second type signal; and generating a reference clock signal meeting a first condition according to the second control parameter. Therefore, an efficiency of generating the reference clock signal can be improved.

27 Claims, 6 Drawing Sheets

(56) References Cited

U.S. PATENT DOCUMENTS

| | | | | |
|---|---|---|---|---|
| 2005/0105660 A1* | 5/2005 | Knotts | H03D 13/004 | 375/376 |
| 2005/0238129 A1* | 10/2005 | Ishida | G11B 20/18 | 375/376 |
| 2006/0170470 A1* | 8/2006 | Wang | H03L 7/07 | 327/158 |
| 2006/0205354 A1* | 9/2006 | Pirzada | H04L 63/0492 | 455/66.1 |
| 2007/0174727 A1* | 7/2007 | Liao | H03L 7/1976 | 714/43 |
| 2008/0253494 A1* | 10/2008 | Aoyama | H03L 7/0814 | 375/376 |
| 2010/0122106 A1* | 5/2010 | Lee | G06F 1/12 | 713/503 |
| 2010/0208299 A1* | 8/2010 | Sakuda | G06F 3/1285 | 358/1.15 |
| 2010/0313059 A1* | 12/2010 | Wang | H03L 7/07 | 713/502 |
| 2011/0012663 A1* | 1/2011 | Crowley | G06F 1/04 | 327/299 |
| 2011/0093736 A1* | 4/2011 | Chiang | H04L 7/0331 | 713/502 |
| 2011/0311012 A1* | 12/2011 | Chen | H03L 7/087 | 375/376 |
| 2012/0019301 A1* | 1/2012 | Murray | G01R 23/15 | 327/299 |
| 2013/0222024 A1* | 8/2013 | Chen | H03L 7/093 | 327/157 |
| 2013/0242678 A1* | 9/2013 | Wang | G11C 11/419 | 365/191 |
| 2013/0251084 A1* | 9/2013 | Werner | H03D 13/004 | 375/375 |
| 2013/0329843 A1* | 12/2013 | Takeuchi | H04L 7/0331 | 375/375 |
| 2015/0003139 A1* | 1/2015 | Chen | G11C 5/025 | 365/51 |
| 2015/0049849 A1* | 2/2015 | Chen | G06F 1/06 | 375/376 |
| 2015/0052378 A1* | 2/2015 | Chen | G06F 12/0246 | 713/501 |
| 2017/0004099 A1* | 1/2017 | Best | G06F 13/1689 | |

* cited by examiner

REFERENCE CLOCK SIGNAL GENERATION METHOD, MEMORY STORAGE DEVICE AND CONNECTION INTERFACE UNIT

CROSS-REFERENCE TO RELATED APPLICATION

This application claims the priority benefit of Taiwan application serial no. 106102079, filed on Jan. 20, 2017. The entirety of the above-mentioned patent application is hereby incorporated by reference herein and made a part of this specification.

BACKGROUND

1. Technology Field

The present disclosure generally relates to a frequency tracking technology, in specific, to a reference clock signal generation method, a memory storage device, and a connection interface unit.

2. Description of Related Art

In recent years, digital cameras, mobile phones, and MP3 players develop quite rapidly, which causes a sharp increase of requirements of consumers on storage media. Rewritable non-volatile memory modules (for example, a flash memory) have features such as data non-volatility, power saving, small volumes, and having no mechanical structure, and therefore are quite suited for being built in the foregoing exemplary portable multimedia devices.

In consideration of costs, some memory devices are provided with oscillation circuits instead of crystal oscillators for generating clock signals. However, a frequency of a clock signal generated by an oscillation circuit may change due to interference of an internal factor (for example, a drive voltage/current offset) or of an external factor (for example, an environment temperature change). Therefore, to communicate with a host system, a memory device may adjust a clock frequency of the memory device itself to be the same with (or, close to) that of an data signal of the host system. For example, in a transmission interface of a universal serial bus (Universal Serial Bus, USB) 2.0, the memory device may adjust a clock frequency of the memory device itself by tracking a frequency of a start of frame (Start Of Frame, SOF) packet from the host system. Or, in a transmission interface of a USB 3.0, the memory device may adjust a clock frequency of the memory device itself by tracking a frequency of a low frequency periodic signaling (Low Frequency Periodic Signaling, LFPS) from the host system. However, these frequency tracking mechanisms can merely track frequency of single-type signal (for example, the SOF signal or the LFPS signal), lacks of flexibility in use, and costs relatively long time.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The present disclosure provides a reference clock signal generation method, a memory storage device, and a connection interface unit, thereby improving efficiency of generating a reference clock signal.

An exemplary embodiment of the present disclosure provides a reference clock signal generation method, applied to a memory storage device, where the reference clock signal generation method includes: receiving a first type signal from a host system; generating a first control parameter according to a frequency of the first type signal; receiving, after receiving the first type signal, a second type signal from the host system, where the first type signal is different from the second type signal; generating a second control parameter according to the frequency of the second type signal; and generating, according to the second control parameter, a reference clock signal meeting a first condition, where the reference clock signal is configured to generate a clock signal having a preset frequency.

Another exemplary embodiment of the present disclosure provides a memory storage device, which includes a connection interface unit, a rewritable non-volatile memory module, and a memory control circuit unit. The connection interface unit is configured to be coupled to a host system. The rewritable non-volatile memory module includes a plurality of physical units. The memory control circuit unit is coupled to the connection interface unit and the rewritable non-volatile memory module, where the connection interface unit is configured to receive a first type signal from the host system; the connection interface unit is further configured to generate a first control parameter according to a frequency of the first type signal; the connection interface unit is further configured, after receiving the first type signal, to receive the second type signal from the host system; the first type signal is different from the second type signal; the connection interface unit is configured to generate a second control parameter according to a frequency of the second type signal; the connection interface unit is further configured to generate, according to the second control parameter, a reference clock signal meeting a first condition; and the reference clock signal is configured to generate a clock signal having a preset frequency.

Another exemplary embodiment of the present disclosure provides a connection interface unit, used for a memory storage device, where the connection interface unit includes a receiving circuit and a reference clock generation circuit. The receiving circuit is configured to receive a first type signal from a host system. The reference clock generation circuit is coupled to the receiving circuit and is configured to generate a first control parameter according to a frequency of the first type signal; the receiving circuit is further configured, after receiving the first type signal, to receive a second type signal from the host system; the first type signal is different from the second type signal; the reference clock generation circuit is further configured to generate a second control parameter according to a frequency of the second type signal; the reference clock generation circuit is further configured to generate, according to the second control parameter, a reference clock signal meeting a first condition; and the reference clock signal is configured to generate a clock signal having a preset frequency.

Based on the foregoing, the present disclosure can track frequencies of at least two types of signals from the host system, and generate control parameters according to the frequencies. Then, the generated control parameters may be used to generate reference clock signal. Compared with the conventional method of tracking a frequency of single one signal to adjust a frequency of a reference clock signal of a memory device itself, the reference clock signal generation method, the memory storage device, and the connection interface unit of the present disclosure can improve efficiency of generating a reference clock signal, and is relatively efficient in frequency tracking.

In order to make the aforementioned and other objectives and advantages of the present disclosure comprehensible, embodiments accompanied with figures are described in detail below.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
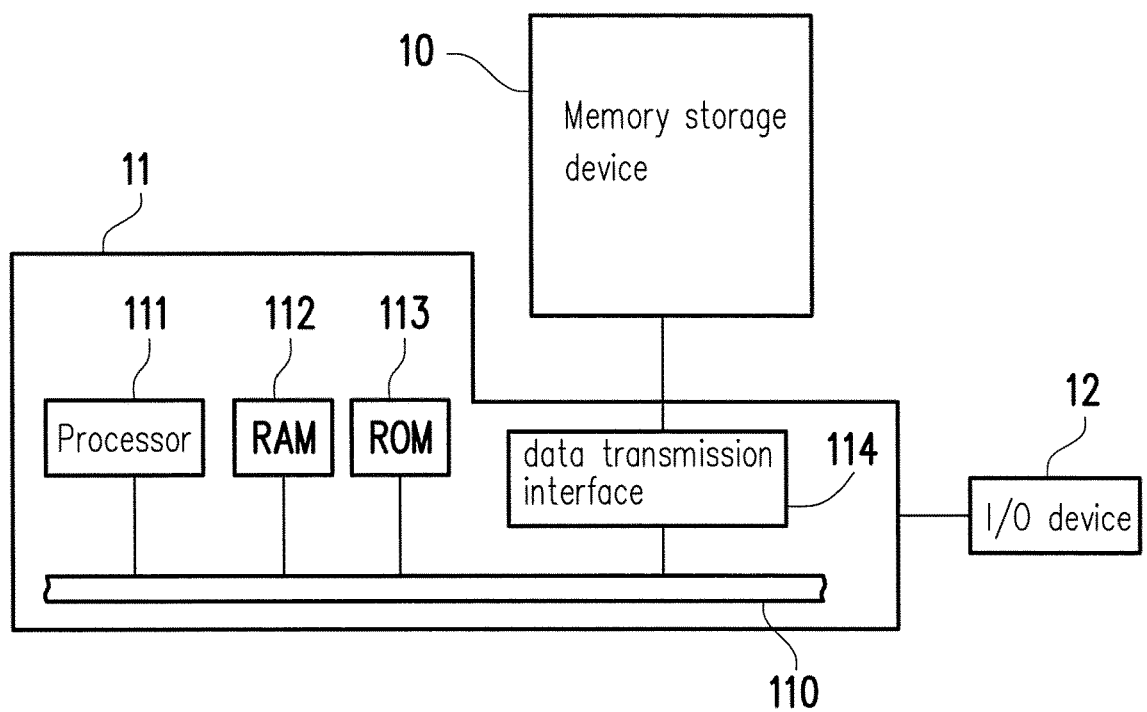
FIG. 1 is a schematic diagram of a host system, a memory storage device, and an input/output (I/O) device according to an exemplary embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, the memory storage device (also known as a memory storage system) includes a rewritable non-volatile memory module and a controller (also known as a control circuit). The memory storage device is usually configured together with a host system so that the host system may write data into the memory storage device or read data from the memory storage device.

Figure 2:
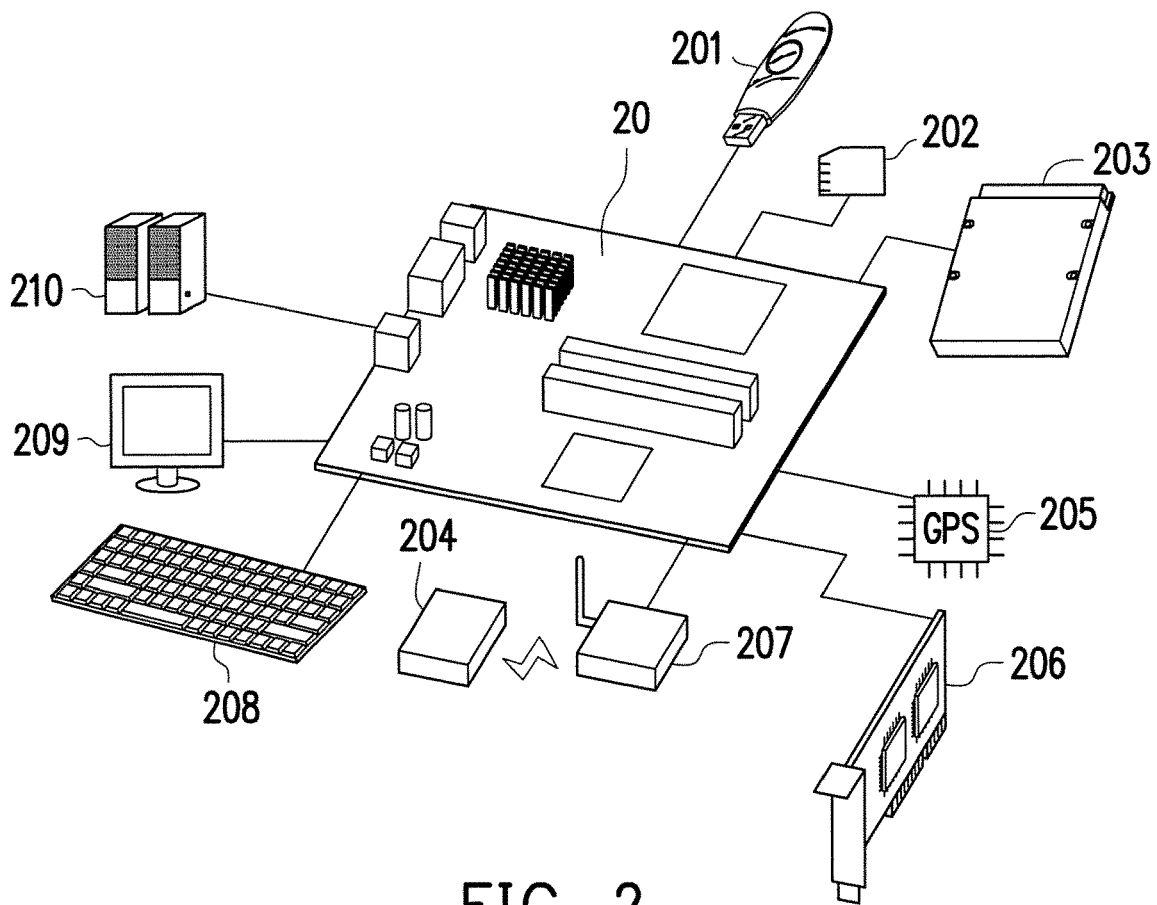
FIG. 2 is a schematic diagram of a host system, a memory storage device, and an input/output (I/O) device according to another exemplary embodiment of the present disclosure.

FIG. 1 is a schematic diagram of a host system, a memory storage device and an I/O (input/output) device according to an exemplary embodiment of the invention. FIG. 2 is a schematic diagram of a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 through the system bus 110. For example, the host system 11 can transmit output signals to the I/O device 12 or receive input signals from I/O device 12 through the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a Bluetooth low energy memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 may access the wireless memory storage device 204 through the wireless transmission device 207.

Figure 3:
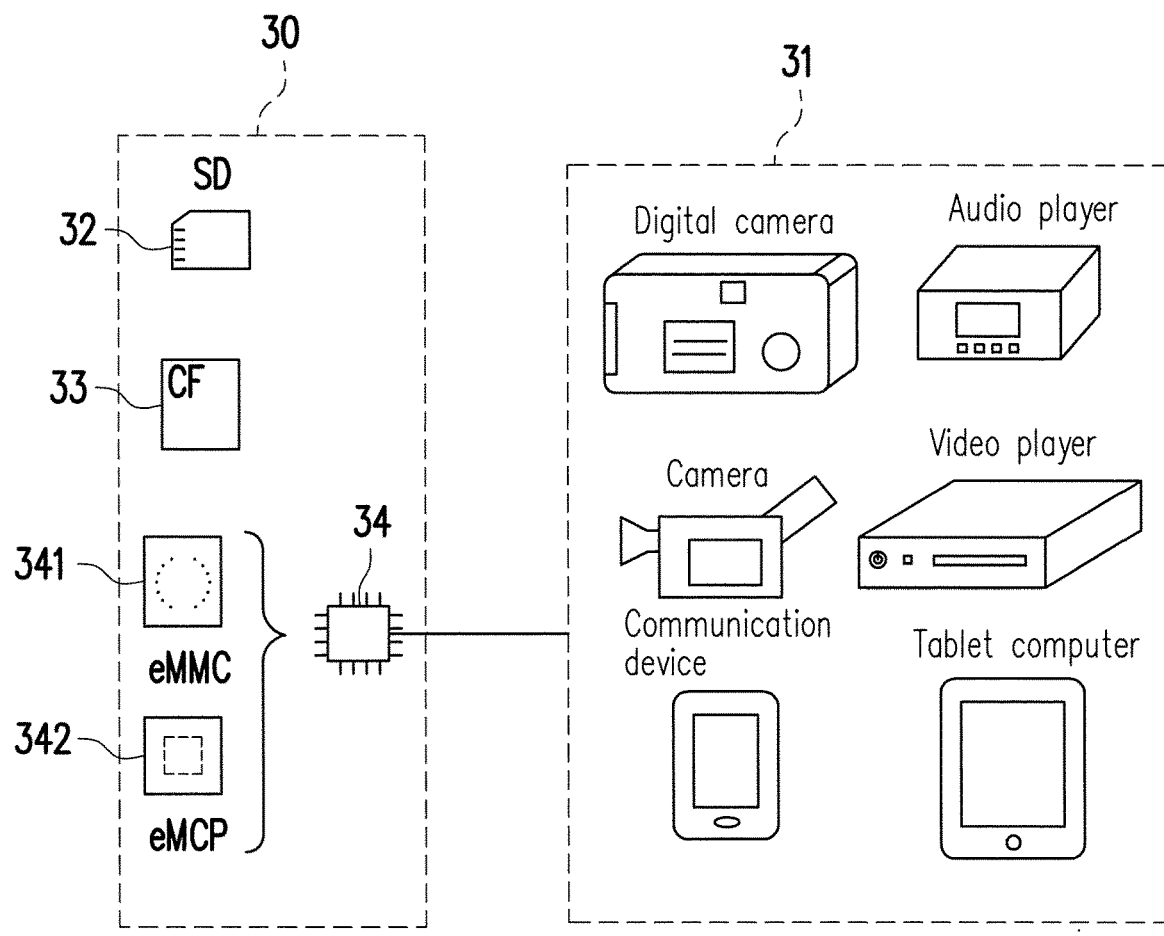
FIG. 3 is a schematic diagram of a host system and a memory storage device according to another exemplary embodiment of the present disclosure.

In one exemplary embodiment, aforementioned host system may be any system capable of substantially cooperating with the memory storage device for storing data. The host system is illustrated as a computer system in foregoing exemplary embodiment; nonetheless, FIG. 3 is a schematic diagram of a host system and a memory storage device according to another exemplary embodiment of the invention. Referring to FIG. 3, a host system 31 may also be a system including a digital camera, a video camera, a communication device, an audio player, a video player or a tablet computer, whereas a memory storage device 30 may be various non-volatile memory devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system 31, such as an eMMC (embedded Multi Media Card) 341 and/or an eMCP (embedded Multi Chip Package) storage device 342.

Figure 4:
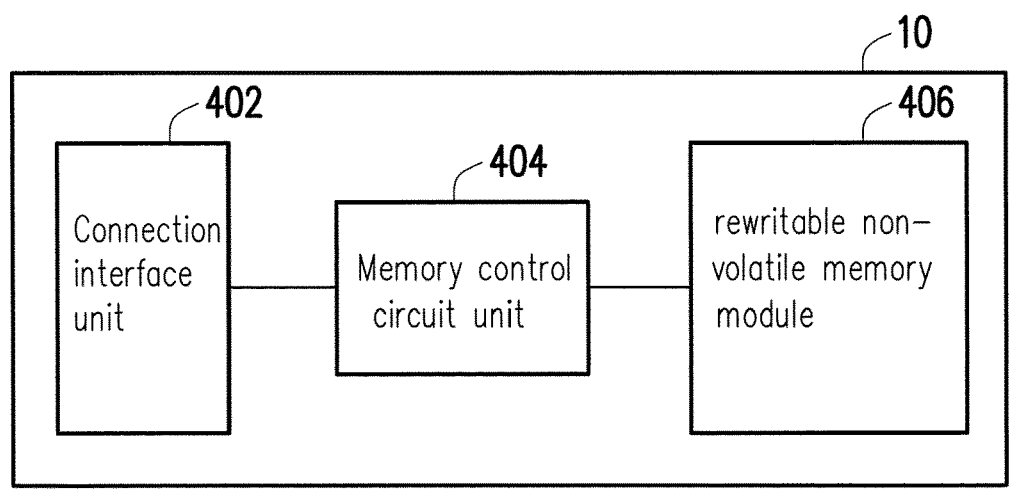
FIG. 4 is a schematic block diagram of a memory storage device according to an exemplary embodiment of the present disclosure.

FIG. 4 is a schematic block diagram of a memory storage device according to an exemplary embodiment of the present disclosure.

Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. In the present exemplary embodiment, the connection interface unit 402 is compatible with a SATA (Serial Advanced Technology Attachment) standard. However, in another exemplary embodiment, the connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standard. The connection interface unit 402 may be encapsulated in a chip with the memory control circuit unit 404, or the connection interface unit 402 may be disposed outside a chip including the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written by the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

Each of the memory cells in the rewritable non-volatile memory module 406 stores one or more bits based on a voltage (hereinafter, also known as a threshold voltage) change. More specifically, in each of the memory cells, a charge trapping layer is provided between a control gate and a channel. Amount of electrons in the charge trapping layer may be changed by applying a write voltage to the control gate thereby changing the threshold voltage of the memory cell. This process of changing the threshold voltage of a memory cell is also known as "writing data into the memory cell" or "programming the memory cell". With changes in the threshold voltage, each of the memory cells in the rewritable non-volatile memory module 406 has a plurality of storage states. The storage state to which the memory cell belongs may be determined by applying a read voltage, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more than two bits, the physical programming units on the same word line can be at least classified into a lower physical programming unit and an upper physical programming unit. For example, a LSB (Least Significant Bit) of one memory cell belongs to the lower physical programming unit, and a MSB (most significant bit) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is a minimum unit for programming. That is, the physical programming unit is the minimum unit for writing data. For example, the physical programming unit is a physical page or a physical sector. If the physical programming unit is the physical page, the physical programming unit usually include a data bit area and a redundancy bit area. The data bit area includes multiple physical sectors configured to store user data, and the redundant bit area is configured to store system data (e.g., management data such as an error correcting code). In the present exemplary embodiment, the data bit area contains 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimal unit for erasing. Namely, each physical erasing unit contains the least number of memory cells to be erased together. For instance, the physical erasing unit is a physical block.

In the present exemplary embodiment, the connection interface unit 402 receives different types of signals from the host system 11 and separately tracks frequencies of these signals. Then, the connection interface unit 402 generates, according to the frequency tracking result, a reference clock signal meeting a specific condition (also referred to as a first condition). In the present exemplary embodiment, a reference clock signal meeting the first condition refers to that a frequency of the reference clock signal is the same as a frequency of a signal from the host system 11; and a reference clock signal not meeting the first condition refers to that a frequency of the reference clock signal is different from a frequency of a signal from the host system 11. Alternatively, in another exemplary embodiment, a reference clock signal meeting the first condition refers to that a difference value between a frequency of the reference clock signal and a frequency of a signal from the host system 11 is less than a preset value; and a reference clock signal not meeting the first condition refers to that a difference value between a frequency of the reference clock signal and a frequency of a signal from the host system 11 is not less than the preset value. In an exemplary embodiment, if a frequency of the generated reference clock signal is locked on a frequency of a signal from the host system 11, it may be considered that a reference clock signal meeting the first condition is generated; on the contrary, if a frequency of the generated reference clock signal is not yet locked on a frequency of a signal from the host system 11, it may be considered that a reference clock signal meeting the first condition is not generated.

In the present exemplary embodiment, the signal from the host system 11 may be data signal used to transmit at least one command (for example, a data writing command, an data deleting command, or various host commands) and/or data corresponding to these command (for example, data to be accessed and a logic address). For example, the command may include specific instruction code, a logic address code, and the like. In an exemplary embodiment, the signal from the host system 11 may include other signals from the host system 11.

In an exemplary embodiment, the reference clock signal may be configured to generate a clock signal having a preset frequency (also referred to as a specific clock signal). For example, the frequency (that is, the preset frequency) of the specific clock signal is the same as a frequency of the reference clock signal. In an exemplary embodiment, a voltage level of the specific clock signal is different from a voltage level of the reference clock signal. For example, the specific clock signal may be obtained by performing voltage boosting or voltage bucking on the reference clock signal. In an exemplary embodiment, there is a phase difference between the specific clock signal and the reference clock signal. For example, the specific clock signal may be obtained by delaying the reference clock signal. The reference clock signal or the specific clock signal may be used to sample the data signal from the host system 11 or may be used to generate the data signal to be transmitted to the host system 11. For example, the data signal to be transmitted to the host system 11 may be used to transmit data which is read by the host system 11, or any response (response) corresponding to an instruction (i.e., command) from the host system 11. In addition, in another exemplary embodiment, the reference clock signal or the specific clock signal may be used by some electronic circuits in the memory storage device 10.

Figure 5:
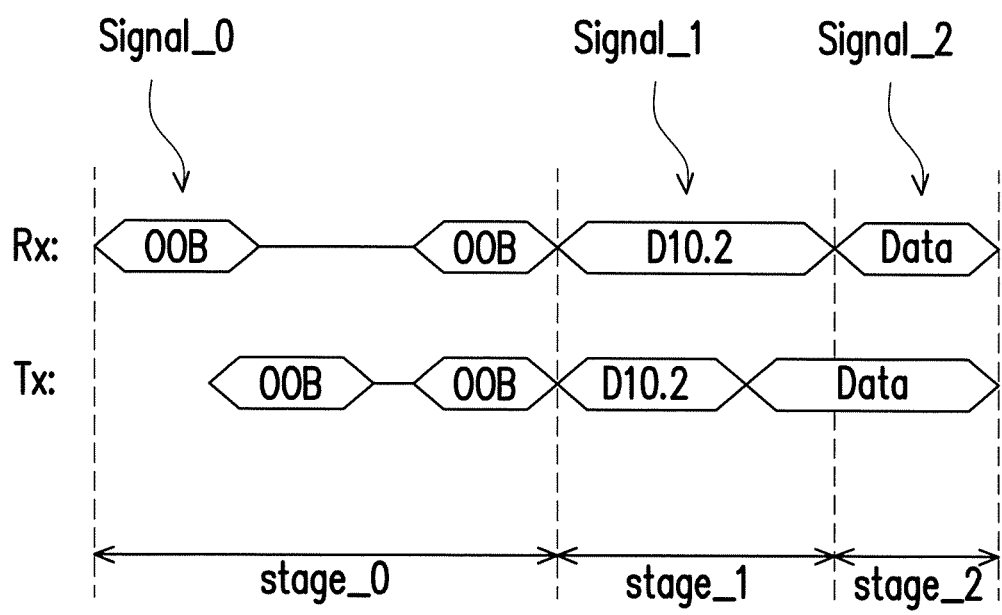
FIG. 5 is a schematic diagram of tracking frequencies of multiple types of signals according to an exemplary embodiment of the present disclosure.

FIG. 5 is a schematic diagram of tracking frequencies of multiple types of signals from the host system according to an exemplary embodiment of the present disclosure.

Referring to FIG. 5, in the present exemplary embodiment, the connection interface unit 402 tracks a frequency of a signal received from the host system 11 in a stage_0, a stage_1, and a stage_2. In the stage_0, the connection interface unit 402 receives a specific type of signal (also referred to as an initial signal) Signal_0 from the host system 11. In the stage_1, the connection interface unit 402 receives another specific type of signal (also referred to as a first type signal) Signal_1 from the host system 11. In addition, in the stage_2, the connection interface unit 402 receives another specific type of signal (also referred to as a second type signal) Signal_2 from the host system 11. The signal Signal_0, the signal Signal_1, and the signal Signal_2 are in different types. It should be noted that, that the signals are in different types may refer to that the signals have different pulse waveforms, different pulse patterns, different pulse components, different frequencies, and/or different use and other comparison standards used to distinguish between different types of signals.

In the present exemplary embodiment, the signal Signal_0 is an out-of-band (OOB) signal. In addition, the signal Signal_0 corresponds to a handshake operation between the host system 11 and the memory storage device 10 before the signal Signal_2 is transmitted. For example, in a stage of establishing a connection between the host system 11 and the memory storage device 10 (that is, the stage_0), the host system 11 and the memory storage device 10 may perform a handshake operation by using the signal Signal_0, to ensure a connection status between the host system 11 and the memory storage device 10. In the present exemplary embodiment, Signal_0 may include at least three types of out-of-band signals such as a COMRESET signal, a COMINIT signal, and a COMWAKE signal. For example, in the handshake operation, the host system 11 transmits a COMRESET signal to the memory storage device 10. For example, the COMRESET signal is used to instruct the memory storage device 10 to perform a hard reset. After the COMRESET signal is received, the connection interface unit 402 transmits a COMINIT signal to the host system 11. For example, the COMINIT signal is used to request communication initialization from the host system 11. The COMINIT signal may be the same as or similar to the COMRESET signal. After the COMINIT signal is received, the host system 11 transmits a COMWAKE signal to the memory storage device 10. In addition, the memory storage device 10 may also transmit the COMWAKE signal to the host system 11.

Figure 6:
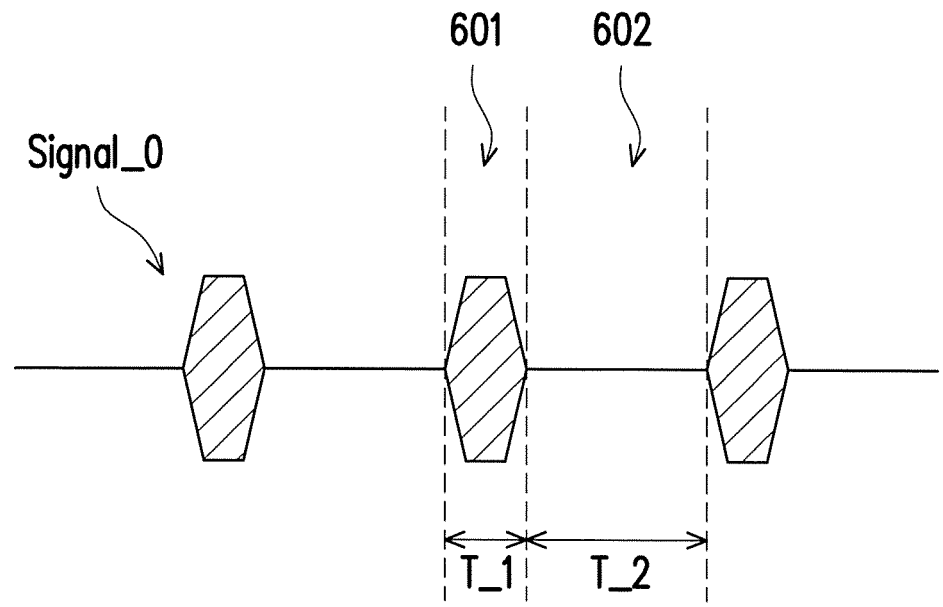
FIG. 6 is a schematic diagram of an initial signal according to an exemplary embodiment of the present disclosure.

FIG. 6 is a schematic diagram of an initial signal according to an exemplary embodiment of the present disclosure.

Referring to FIG. 6, in the present exemplary embodiment, a signal Signal_0 is out-of-band signal includes multiple bursts 601 and multiple gaps (gap) 602, where each burst is labeled as a slash. For example, in the COMRESET signal and the COMINIT signal, a time width T_1 of a burst 601 is about 106 ns, and a time width T_2 of a gap 602 is about 320 ns; and in the COMWAKE signal, the time width T_1 and T_2 are both about 106 ns. However, the time width T_1 and T_2 may change with actual requirements, which is not limited in the present disclosure. In addition, in the present exemplary embodiment, the signal Signal_0 is a differential signal and consists of two signals having the same (or similar) amplitude and opposite phases. It should be noted that, in other exemplary embodiments that are not mentioned, the signal Signal_0 may be in other types different the out-of-band signal, such that the signal Signal_0 may have other waveforms, frequencies and so on.

In the present exemplary embodiment, the connection interface unit 402 tracks a frequency of the signal Signal_0 in the stage_0. For example, in an exemplary embodiment, the connection interface unit 402 tracks a frequency of the COMRESET signal of the out-of-band signal in the stage_0. Alternatively, in another exemplary embodiment, the connection interface unit 402 tracks the frequency of at least one of the COMRESET signal, the COMINIT signal and the COMWAKE signal of the out-of-band signal in the stage_0.

After finishing the frequency tracking operation in the stage_0, the host system 11 enters a next stage (that is, the stage_1). In the stage_1, the host system 11 starts to transmit the signal Signal_1. It should be noted that, the signal Signal_1 and the signal Signal_0 are in different types. For example, compared with the signal Signal_0 that is a differential signal in the exemplary embodiment in FIG. 6, the signal Signal_1 may not be a differential signal, but be a clock signal (or a 0/1 interleaved signal) having a stable frequency and/or a stable amplitude. In addition, in the present exemplary embodiment, the signal Signal_1 is also referred to as a D10.2 signal.

In the present exemplary embodiment, the connection interface unit 402 continuously tracks a frequency of the signal Signal_1 in the stage_1. It should be noted that, in the stage_1, if the frequency tracking operation of the signal Signal_1 is finished, the connection interface unit 402 transmits an align signal (not drawn in the drawing) to the host system 11. After the align signal is recognized by the host system 11, the host system 11 stops transmitting the signal Signal_1 and enters a next stage (that is, the stage_2). In addition, if the align signal is not recognized, the host system 11 continuously transmits the signal Signal_1.

Figure 7:
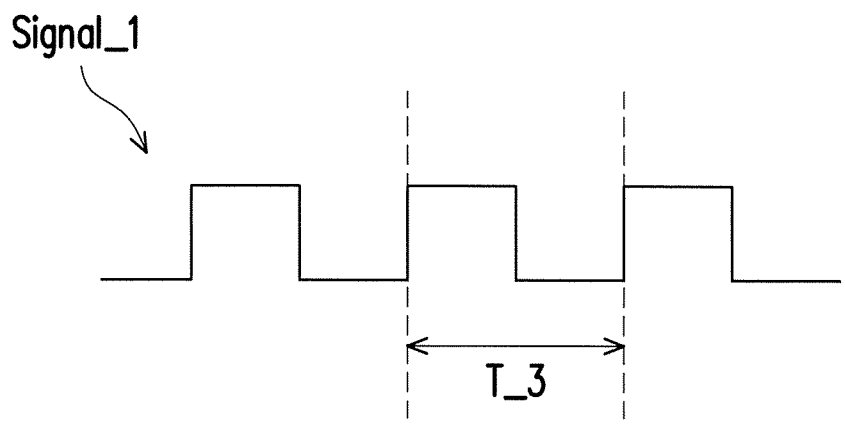
FIG. 7 is a schematic diagram of a first type signal according to an exemplary embodiment of the present disclosure.

FIG. 7 is a schematic diagram of a first type signal according to an exemplary embodiment of the present disclosure.

Referring to FIG. 7, before recognizing the align signal from the memory storage device 10, the host system 11 continuously transmits the signal Signal_1 to the memory storage device 10. In the present exemplary embodiment, the signal Signal_1 is the D10.2 signal which includes multiple interleaved logic high (or, logic 1) and logic low (or, logic 0). In addition, a frequency of the signal Signal_1 is about 1.5 GHz. It should be noted that, in other exemplary embodiments that are not mentioned, the signal Signal_1 may be in other types and may have other waveforms and/or frequencies different from that of the D10.2 signal.

After entering the stage_2, the host system 11 starts to transmit the signal Signal_2. In the present exemplary embodiment, the signal Signal_2 is data signal from the host system 11. For example, after experiencing the stage_0 and the stage_1, the host system 11 sends the signal Signal_2 to transmit instructions (or commands) and data corresponding to the instructions, where the instructions may instruct the memory storage device 10 to perform specific operation. For example, the specific operation may be various operations that the host system 11 may instruct the memory storage device 10 to perform, such as a data writing operation or a data deleting operation. In addition, in the present exemplary embodiment, the connection interface unit 402 tracks a frequency of the signal Signal_0 in the stage_2.

In the present exemplary embodiment, the stage_0, the stage_1, and the stage_2 occur subsequently. For example, the signal Signal_1 is transmitted subsequently after the signal Signal_0 is transmitted, and the signal Signal_2 is transmitted subsequently after the signal Signal_1 is transmitted. However, in another exemplary embodiment, there may be other stages for transmitting other signals between any two stages of the stage_0, the stage_1, and the stage_2. For example, in another exemplary embodiment, the signal Signal_1 is not transmitted subsequently after the signal Signal_0 is transmitted, and/or the signal Signal_2 is not transmitted subsequently after the signal Signal_1 is transmitted.

In the present exemplary embodiment, the memory storage device 10 separately sends corresponding response signals to the host system 11 in the stage_0, the stage_1, and the stage_2. For example, in the stage_0, the connection interface unit 402 transmits a signal (for example, the COMINIT signal) corresponding to the performed handshake operation to the host system 11, so as to inform the host system 11 to enter the next stage. For example, in the stage_1, the connection interface unit 402 transmits the D10.2 signal and data signal including the align signal to the host system 11, where the align signal is used to inform the host system 11 to enter the next stage. In addition, in the stage_2, the connection interface unit 402 transmits data signal corresponding to a performing result of a specific instruction to the host system 11. For example, with respect to a data reading instruction from the host system 11, the connection interface unit 402 may transmit data signal carrying data read according to the data reading instruction in the stage_2. A specific signal receiving and transmitting mechanism is shown as FIG. 5, however, it is not intended for limiting the present disclosure.

In the present exemplary embodiment, frequency tracking operations performed in the stage_0, the stage_1, and the stage_2 are used to determine one or more control parameters, and the control parameters are used to control or adjust a frequency of the reference clock signal generated by the connection interface unit 402. It should be noted that, the control parameters may be continuously modified based on the frequency tracking operations performed in the different stages. For example, after tracking the frequency of the signal Signal_0, the connection interface unit 402 may generate an initial parameter (also referred to as an initial control parameter) according to the tracked frequency of the signal Signal_0. For example, the initial control parameter may be considered as an initial value of the control parameter.

After tracking the frequency of the signal Signal_1, the connection interface unit 402 may generate another control parameter (also referred to as a first control parameter) according to the tracked frequency of the signal Signal_1. The first control parameter may be directly generated or obtained based on the initial control parameter. For example, in an exemplary embodiment, the connection interface unit 402 adjusts the initial control parameter to be the first control parameter according to the tracked frequency of the signal Signal_1.

After tracking the frequency of the signal Signal_2, the connection interface unit 402 may further generate another control parameter (also referred to as a second control parameter) according to the tracked frequency of the signal Signal_2. The second control parameter may be directly generated or obtained based on the first control parameter. For example, in an exemplary embodiment, the connection interface unit 402 adjusts the first control parameter to be the second control parameter according to the tracked frequency of the signal Signal_2.

The connection interface unit 402 generates, according to the second control parameter, the reference clock signal meeting the first condition. For example, in an operation of continuously adjusting the control parameter, the frequency of the reference clock signal generated by the connection interface unit 402 according to the control parameter may be closer to the frequency of the signal from the host system 11. In an exemplary embodiment, the connection interface unit 402 locks a frequency of the reference clock signal, that is generated based on the frequency tracking operation in the stage_2, on a frequency of the signal Signal_2.

In the present exemplary embodiment, the connection interface unit 402 has an oscillator (not drawn in the drawing) and does not have a crystal oscillator. An oscillator of the connection interface unit 402 may be a voltage-controlled oscillator or a digital oscillator and is used to generate the reference clock signal. For example, if the oscillator is a voltage-controlled oscillator, the control parameter may be a control voltage used to control the frequency of the reference clock signal output by the voltage-controlled oscillator. Alternatively, if the oscillator is a digital oscillator, the control parameter may be a control code used to control the frequency of the reference clock signal output by the digital oscillator.

From another aspect, in the stage_0, a target signal on which the connection interface unit 402 performs the frequency tracking operation is the signal Signal_0, and the connection interface unit 402 generates the initial control parameter according to the frequency tracking result of the signal Signal_0. In the stage_1, a target signal on which the connection interface unit 402 performs the frequency tracking operation is switched to the signal Signal_1, and the connection interface unit 402 generates the first control parameter according to the frequency tracking result of the signal Signal_1. Then, in the stage_2, a target signal on which the connection interface unit 402 performs the frequency tracking operation is further switched to the signal Signal_2, and the connection interface unit 402 generates the second control parameter according to the frequency tracking result of the signal Signal_2.

In an exemplary embodiment, a precision degree of adjusting the control parameter in the stage_0 is lower than a precision degree of adjusting the control parameter in the stage_1 and/or the stage_2; and a precision degree of adjusting the control parameter in the stage_1 is lower than a precision degree of adjusting the control parameter in the stage_2. The precision degree corresponds to an adjustment level (or an adjustment gap) of the control parameter. For example, in the stage_0, the adjustment operation performed on a control parameter may be considered as a coarse adjustment operation, where the control parameter is adjusted by using a largest adjustment level, so as to roughly control the frequency of the first signal within a preset range near the frequency of the target signal; in the stage_1, an adjustment operation on the control parameter may be considered as coarse adjustment in combination with a fine adjustment operation, where the control parameter is adjusted by using a second largest adjustment level, so as to further control the frequency of the first signal from the preset range to further closer to the frequency of the target signal based on better precision degree; and in the stage_2, an adjustment operation on the control parameter may be a fine adjustment operation, where the control parameter is adjusted by using a smallest adjustment level, so as to lock the frequency of the first signal as (or close to) the frequency of the target signal based on the lowest error (or highest precision).

It should be noted that, in the foregoing exemplary embodiments, continuously tracking frequencies of the signal Signal_0, Signal_1, and Signal_2 and generating corresponding control parameters according to a frequency tracking result are used as examples. However, in another exemplary embodiment, the connection interface unit 402 may merely track the frequency of the signal Signal_0 and the frequency of the signal Signal_2 (that is, not tracking a frequency of the signal Signal_1). Alternatively, in another exemplary embodiment, the connection interface unit 402 may merely track the frequency of the signal Signal_1 and the frequency of the signal Signal_2 (that is, not tracking the frequency of the signal Signal_0). Then, the connection interface unit 402 generates the control parameter according to the frequency tracking result.

It should be noted that, in the foregoing exemplary embodiments, the signal signal_0 may be considered as the initial signal, the signal signal_1 may be considered as the first type signal, and the signal signal_2 may be considered as the second type signal. However, classification of these signals may be adjusted based on actual requirements. For example, in another exemplary embodiment of FIG. 5, a part of the signal signal_0 and the signal signal_1 or a combination of the signal signal_0 and the signal signal_1 may be referred to as the first type signal, and/or a part of the signal signal_1 and the signal signal_2 or a combination of the signal signal_1 and the signal signal_2 may be referred to as the second type signal. For example, in an exemplary embodiment in which the frequency of the signal Signal_0 and the frequency of the signal Signal_2 are tracked (e.g., the frequency of the signal Signal_1 is not tracked), the signal Signal_0 may be considered as the foregoing first type signal, rather than the initial signal.

Figure 8:
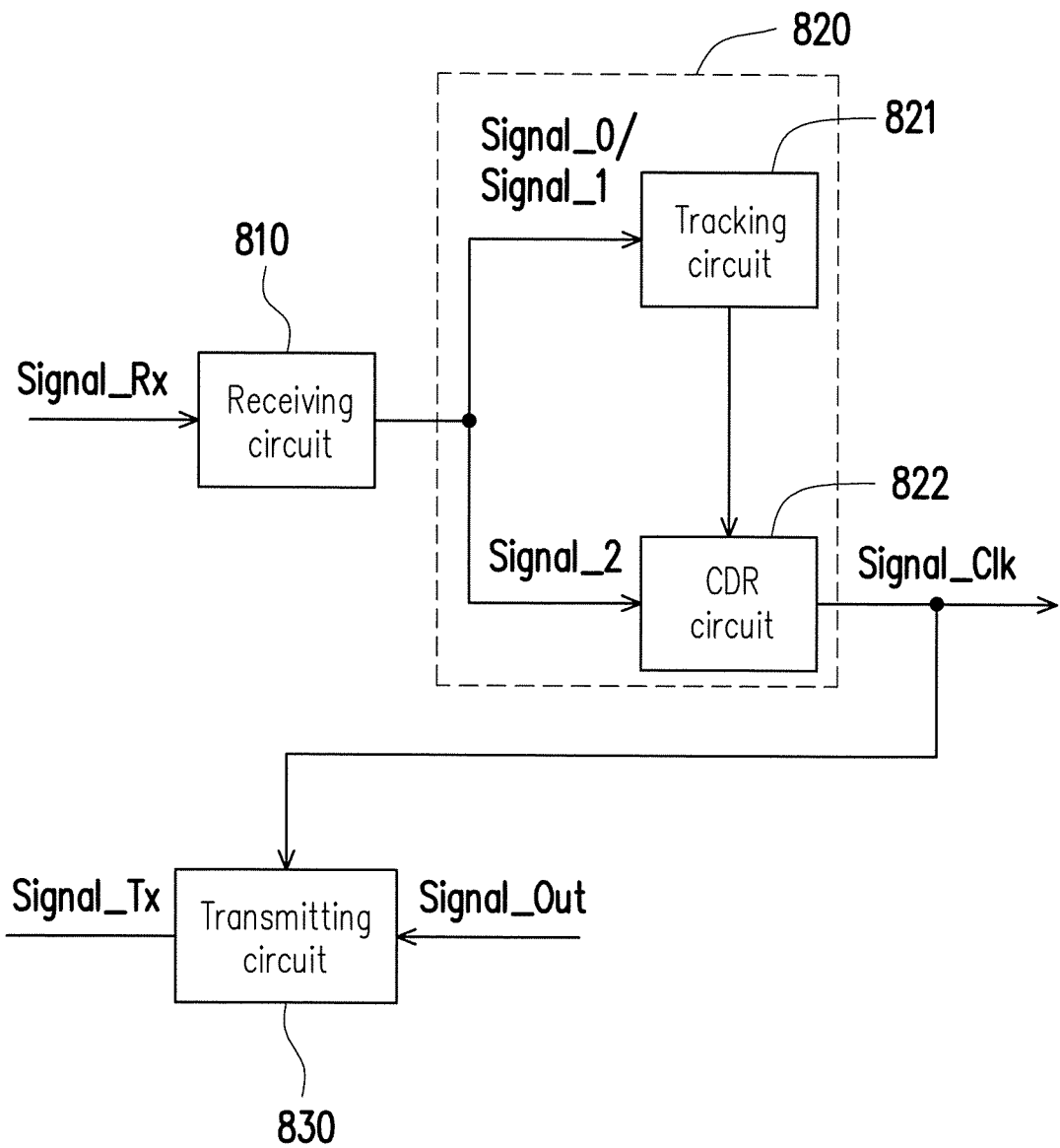
FIG. 8 is a schematic diagram of a connection interface unit according to an exemplary embodiment of the present disclosure.

FIG. 8 is a schematic diagram of a connection interface unit according to an exemplary embodiment of the present disclosure.

Referring to FIG. 8, in the present exemplary embodiment, the connection interface unit 402 includes a receiving circuit 810, a reference clock generation circuit 820, and a transmitting circuit 830. The reference clock generation circuit 820 is coupled to the receiving circuit 810 and the transmitting circuit 830. The receiving circuit 810 is configured to receive a signal Signal_Rx from the host system 11. The reference clock generation circuit 820 is configured to receive an output signal of the receiving circuit 810 and generate, according to the output signal, a signal Signal_Clk (that is, the reference clock signal). It should be noted that, the reference clock generation circuit 820 tracks, in multiple stages, frequencies of multiple types of signals from the host system 11, and adjusts, according to a frequency tracking result, a control parameter used to control a frequency of the signal Signal_Clk, so as to lock the frequency of the signal Signal_Clk as (or, close to) a frequency of at least one type of signals from the host system 11.

In the present exemplary embodiment, the reference clock generation circuit 820 includes a tracking circuit 821 and a clock and data recovery circuit (CDR) 822. The tracking circuit 821 is coupled to the clock and data recovery circuit 822. Using FIG. 5 as an example, the tracking circuit 821 is configured to track a frequency of a signal Signal_0 and/or a signal Signal_1 from the host system 11; and the clock and data recovery circuit 822 is configured to track a frequency of a signal Signal_2 from the host system 11. For example, in the stage_0 and/or the stage_1 of FIG. 5, the tracking circuit 821 is enabled (or activated) to receive a signal from the host system 11 through the receiving circuit 810 and perform a frequency tracking operation. Then, in the stage_2 of FIG. 5, the tracking circuit 821 is disabled (or closed), and the clock and data recovery circuit 822 is enabled to receive a signal from the host system 11 through the receiving circuit 810 and perform a frequency tracking operation.

It should be noted that, in an exemplary embodiment of FIG. 8, it is assumed that an oscillator configured to generate the signal Signal_Clk according to the control parameter (for example, the initial control parameter, the first control parameter, and the second control parameter) is configured in the clock and data recovery circuit 822. Therefore, the tracking circuit 821 transmits frequency tracking result of the signal Signal_0 and/or the signal Signal_1 to the clock and data recovery circuit 822. The clock and data recovery circuit 822 may set the control parameter (for example, setting the control parameter as the initial control parameter or the first control parameter) in respond to such frequency tracking result of the signal Signal_0 and/or the signal Signal_1. Then, the clock and data recovery circuit 822 further updates, according to the frequency tracking result of the signal Signal_2, the control parameter (for example, setting the control parameter as the second control parameter). Accordingly, the frequency of the signal Signal_Clk may be locked, according to the updated control parameter (that is, the second control parameter), as (or close to) the frequency of the signal Signal_2. In addition, in another exemplary embodiment, the oscillator configured to generate the signal Signal_Clk according to the control parameter may be configured outside the clock and data recovery circuit 822, so that the tracking circuit 821 and the clock and data recovery circuit 822 separately provide, according to the frequency tracking result, corresponding control parameters to the oscillator for generating the signal Signal_Clk.

In the present exemplary embodiment, the transmitting circuit 830 receives the signal Signal_Clk and modulates a signal Signal_Out to generate a signal Signal_Tx according to the signal Signal_Clk. For example, the transmitting circuit 830 may (directly) use the signal Signal_Clk to modulate the signal Signal_Out to generate the signal Signal_Tx. Alternatively, the transmitting circuit 830 may use a specific clock signal generated according to the signal Signal_Clk to modulate the signal Signal_Out, so as to generate the signal Signal_Tx. The transmitting circuit 830 transmits the signal Signal_Tx to the host system 11. For example, the signal Signal_Tx may be a signal transmitted to the host system 11 through the connection interface unit 402 in any stage of the stage_1 to the stage 3 in an exemplary embodiment of FIG. 5. In addition, in an exemplary embodiment, the signal Signal_Clk or the specific clock signal generated according to the signal Signal_Clk may be used to sample data signal (e.g., the signal Signal_2) from the host system 11 in the stage_2 of FIG. 5.

In an exemplary embodiment, the clock and data recovery circuit 822 is applicable to (or dedicated to) track and lock a frequency of a high-speed signal (for example, a high-speed data signal). On the contrary, the tracking circuit 821 is applicable to (or, dedicated to) track or lock a frequency of a non-high-speed signal. For example, in an exemplary embodiment, the high-speed signal refers to a signal (e.g., the data signal) having a frequency higher than 5 GHz, and the non-high-speed signal refers to a signal having a frequency lower than 5 GHz. However, in another exemplary embodiment, a frequency (or, a frequency threshold) used to distinguish between the high-speed signal and the non-high-speed signal may be higher (for example, 10 GHz) or lower (for example, 4 GHz), which is not limited in the present disclosure.

It should be noted that, the foregoing exemplary embodiments use tracking multiple types of signals transmitted between the host system 11 and the memory storage device 10 under the serial advanced technology attachment (SATA) standard as examples. However, in another exemplary embodiment, a connection interface standard between the host system 11 and the memory storage device 10 is changed, and therefore types of the tracked multiple types of signals transmitted between the host system 11 and the memory storage device 10 may also be different. In other words, that a control parameter used to control a frequency of a reference clock signal can be continuously generated or updated by tracking frequencies of two or more types of signals belongs to the scope of the present disclosure.

Figure 9:
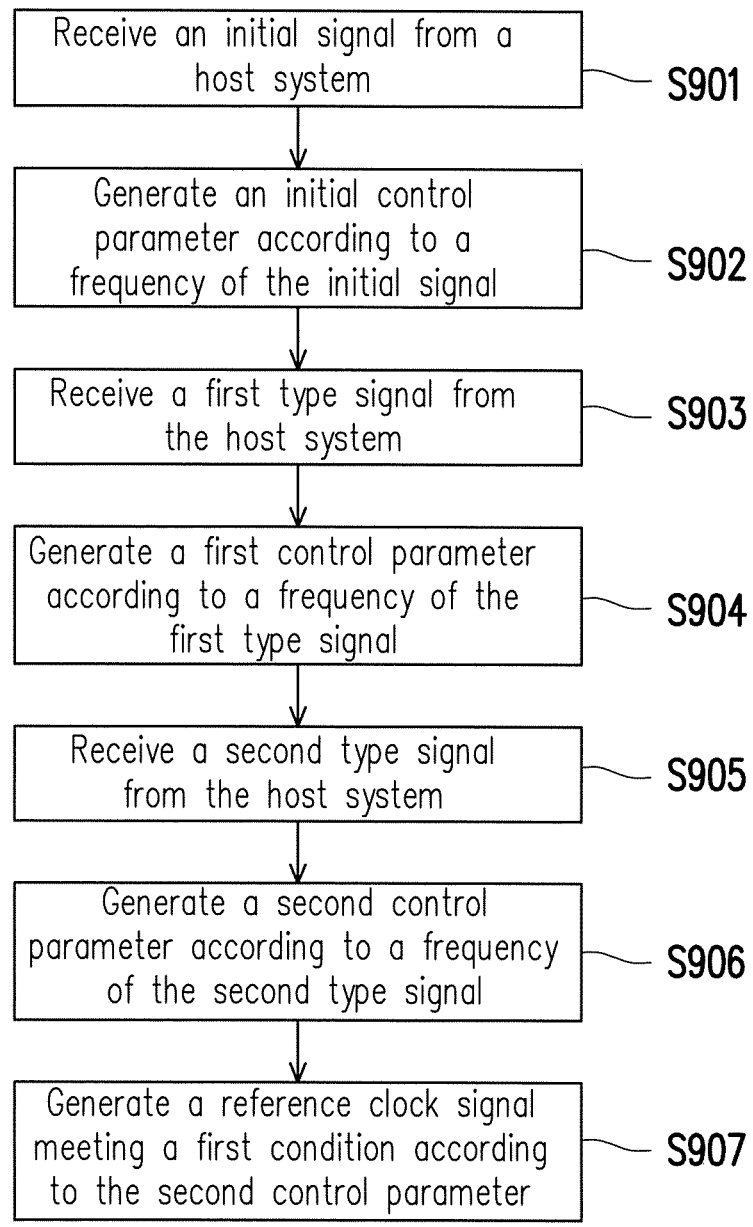
FIG. 9 is a flowchart of a reference clock signal generation method according to an exemplary embodiment of the present disclosure.

FIG. 9 is a flowchart of a reference clock signal generation method according to an exemplary embodiment of the present disclosure.

Referring to FIG. 9, in step S901, an initial signal is received from a host system. In step S902, an initial control parameter is generated according to a frequency of the initial signal. In step S903, a first type signal is received from the host system. In step S904, a first control parameter is generated according to the first type signal. For example, the first control parameter may be directly generated or obtained based on the initial control parameter. In step S905, a second type signal is received from the host system, where the first type signal is different from the second type signal. In step S906, a second control parameter is generated according to a frequency of the second type signal. For example, the second control parameter may be directly generated or obtained based on the first control parameter. In step S907, a reference clock signal meeting a first condition is generated according to the second control parameter. It should be noted that, in another exemplary embodiment of FIG. 9, step S901 and step S902 may be ignored, and the reference clock signal generation method may start from step S903.

However, steps in FIG. 9 are described in detail as above, and the descriptions thereof are omitted herein. It should be noted that, steps in FIG. 9 may be implemented by multiple programming codes or circuits, which is not limited in the present disclosure. In addition, the method of FIG. 9 may be used in combination with the foregoing exemplary embodiments, or may be used independently, which is not limited in the present disclosure.

Based on the foregoing, the present disclosure provides to track frequencies of at least two types of signals from the host system and generate control parameters accordingly. Then, the generated control parameters may be used to generate reference clock signal meeting the first condition. Compared with the conventional method of tracking the frequency of single one type of signal to adjust the frequency of the reference clock signal, the reference clock signal generation method, the memory storage device, and the connection interface unit of the present disclosure can improve efficiency of generating the reference clock signal, and are relatively efficient in frequency tracking.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A reference clock signal generation method, applied to a memory storage device, wherein the reference clock signal generation method comprises:
   receiving an initial signal from a host system;
   generating an initial control parameter according to a frequency of the initial signal, wherein the initial control parameter is configured to adjust a frequency of a reference clock signal;
   receiving a first type signal from the host system after receiving the initial signal;
   generating a first control parameter according to a frequency of the first type signal;
   receiving a second type signal from the host system after receiving the first type signal, wherein the first type signal is different from the second type signal;
   generating a second control parameter according to a frequency of the second type signal; and
   generating the reference clock signal meeting a first condition according to the second control parameter, wherein the reference clock signal is configured to generate a clock signal having a preset frequency.

2. The reference clock signal generation method according to claim 1, wherein the first type signal is transmitted subsequently after the initial signal, and the second type signal is transmitted subsequently after the first type signal.

3. The reference clock signal generation method according to claim 1, wherein the initial signal is used in a handshake operation between the memory storage device and the host system.

4. The reference clock signal generation method according to claim 3, wherein the initial signal is an out-of-band (OOB) signal.

5. The reference clock signal generation method according to claim 1, wherein the first control parameter is obtained based on the initial control parameter.

6. The reference clock signal generation method according to claim 1, wherein the second type signal is subsequently transmitted after the first type signal.

7. The reference clock signal generation method according to claim 1, wherein the second control parameter is obtained based on the first control parameter.

8. The reference clock signal generation method according to claim 1, wherein the first control parameter and the second control parameter are configured to adjust a frequency of the reference clock signal.

9. The reference clock signal generation method according to claim 1, wherein the memory storage device is compatible with a serial advanced technology attachment (SATA) standard.

10. A memory storage device, comprising:
   a connection interface unit, configured to be coupled to a host system;
   a rewritable non-volatile memory module, comprising a plurality of physical units; and
   a memory control circuit unit, coupled to the connection interface unit and the rewritable non-volatile memory module,
   wherein the connection interface unit is configured to receive an initial signal from the host system;
   wherein the connection interface unit is further configured to generate an initial control parameter according to a frequency of the initial signal, and the initial control parameter is configured to adjust a frequency of a reference clock signal;
   wherein the connection interface unit is further configured to receive a first type signal from the host system after receiving the initial signal;
   wherein the connection interface unit is further configured to generate a first control parameter according to a frequency of the first type signal;
   wherein the connection interface unit is further configured to receive a second type signal from the host system after receiving the first type signal, wherein the first type signal is different from the second type signal;
   wherein the connection interface unit is further configured to generate a second control parameter according to a frequency of the second type signal,
   wherein the connection interface unit is further configured to generate the reference clock signal meeting a first condition according to the second control parameter, wherein the reference clock signal is configured to generate a clock signal having a preset frequency.

11. The memory storage device according to claim 10, wherein the first type signal is transmitted subsequently after the initial signal, and the second type signal is transmitted subsequently after the first type signal.

12. The memory storage device according to claim 10, wherein the initial signal is used in a handshake operation between the memory storage device and the host system.

13. The memory storage device according to claim 12, wherein the initial signal is an out-of-band signal.

14. The memory storage device according to claim 10, wherein the first control parameter is obtained based on the initial control parameter.

15. The memory storage device according to claim 10, wherein the second type signal is transmitted subsequently after the first type signal.

16. The memory storage device according to claim 10, wherein the second control parameter is obtained based on the first control parameter.

17. The memory storage device according to claim 10, wherein the first control parameter and the second control parameter are configured to adjust a frequency of the reference clock signal.

18. The memory storage device according to claim 10, wherein the connection interface unit is compatible with a serial advanced technology attachment standard.

19. A connection interface unit, for a memory storage device, wherein the connection interface unit comprises:
   a receiving circuit, configured to receive a first type signal from a host system; and
   a reference clock generation circuit, coupled to the receiving circuit and configured to generate a first control parameter according to a frequency of the first type signal,
   wherein the receiving circuit is further configured to receive a second type signal from the host system after receiving the first type signal, wherein the first type signal is different from the second type signal,
   wherein the reference clock generation circuit is further configured to generate a second control parameter according to a frequency of the second type signal,
   wherein the reference clock generation circuit is further configured to generate a reference clock signal meeting a first condition according to the second control parameter, wherein the reference clock signal is configured to generate a clock signal having a preset frequency,
   wherein the receiving circuit is further configured to receive an initial signal from the host system before receiving the first type signal,
   wherein the reference clock generation circuit is further configured to generate an initial control parameter according to a frequency of the initial signal, and the initial control parameter is configured to adjust a frequency of the reference clock signal.

20. The connection interface unit according to claim 19, wherein the first type signal is transmitted subsequently after the initial signal, and the second type signal is transmitted subsequently after the first type signal.

21. The connection interface unit according to claim 19, wherein the initial signal is used in a handshake operation between the memory storage device and the host system.

22. The connection interface unit according to claim 21, wherein the initial signal is an out-of-band signal.

23. The connection interface unit according to claim 19, wherein the first control parameter is obtained based on the initial control parameter.

24. The connection interface unit according to claim 19, wherein the second type signal is transmitted subsequently after the first type signal.

25. The connection interface unit according to claim 19, wherein the second control parameter is obtained based on the first control parameter.

26. The connection interface unit according to claim 19, wherein the first control parameter and the second control parameter are configured to adjust a frequency of the reference clock signal.

27. The connection interface unit according to claim 19, wherein the connection interface unit is compatible with a serial advanced technology attachment standard.

* * * * *